United States Patent [19]

Burleson

[11] 4,068,877

[45] Jan. 17, 1978

[54] ROLLER VEHICLE PUSHING BUMPER

[75] Inventor: Finn Burleson, Lubbock, Tex.

[73] Assignees: Winston P. Brummette; Craig Brummette, both of Lubbock, Tex.; part interest to each

[21] Appl. No.: 710,472

[22] Filed: Aug. 2, 1976

[51] Int. Cl.$^2$ .................. B60R 19/00; B60R 21/14; B61F 19/04
[52] U.S. Cl. .................. 293/72; 293/49; 280/481; 293/17
[58] Field of Search ............... 293/DIG. 1, 72, 64–67, 293/49, 17, 18, 19; 280/481; 29/148.4 D

[56] References Cited

U.S. PATENT DOCUMENTS

| | | | |
|---|---|---|---|
| 1,665,085 | 4/1928 | Cunningham | 293/72 |
| 1,833,461 | 11/1931 | Grupe | 29/148.4 D |
| 2,069,282 | 2/1937 | Silverman | 293/18 |
| 2,077,110 | 4/1937 | Johnson | 293/49 |
| 2,182,085 | 12/1939 | Kellner | 293/72 |
| 3,184,253 | 5/1965 | Bratton | 280/481 |

Primary Examiner—Trygve M. Blix
Assistant Examiner—D. W. Keen
Attorney, Agent, or Firm—Clarence A. O'Brien; Harvey B. Jacobson

[57] ABSTRACT

A vehicle pushing bumper having a resilient roller rotatably mounted on a bracket secured to the front bumper of a motor vehicle. The spin of the roller, together with its resilient construction, prevent a drag on and damage to a vehicle being pushed by the vehicle provided with the pushing bumper. Usually, a pair of pushing bumpers will be disposed in symmetrical relation on the front bumper of a vehicle for assuring continuous contact between at least one of the pushing bumpers and the vehicle being pushed.

1 Claim, 4 Drawing Figures

U.S. Patent      Jan. 17, 1978      4,068,877
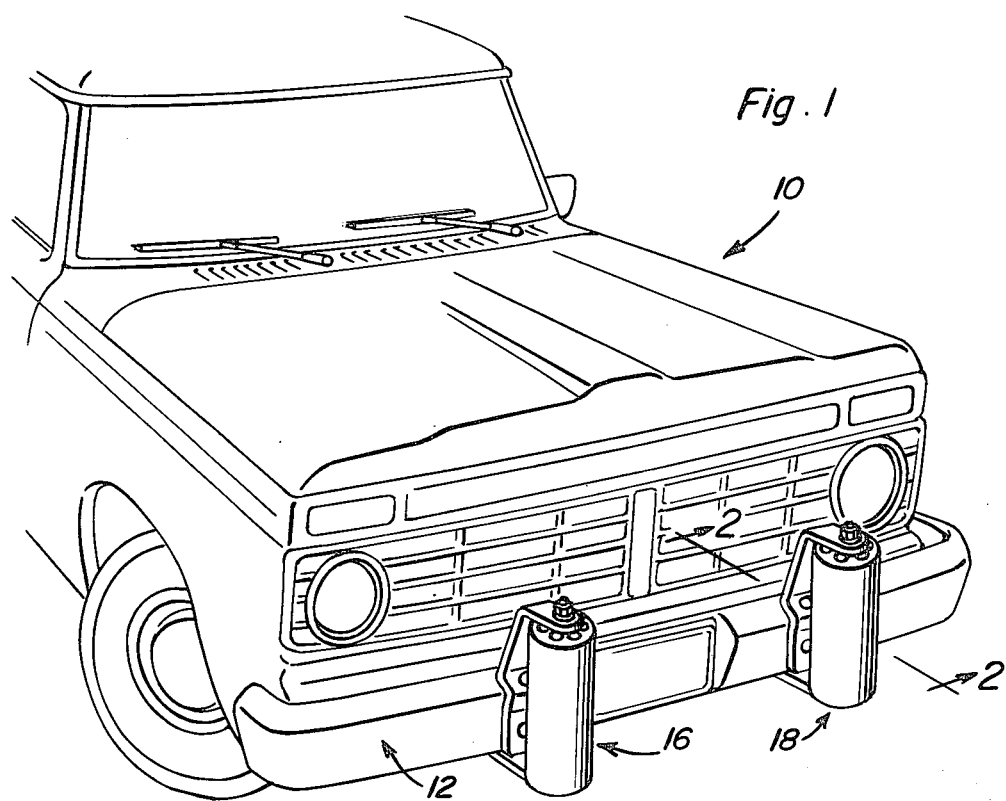
Fig. 1
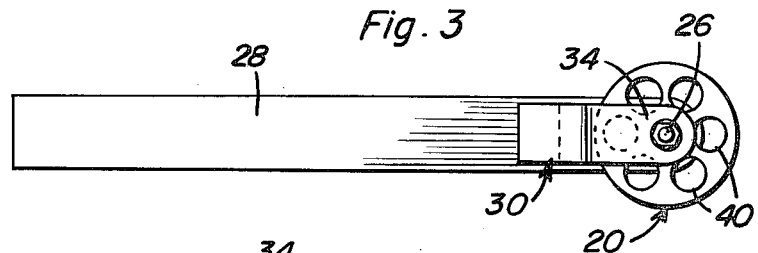
Fig. 3
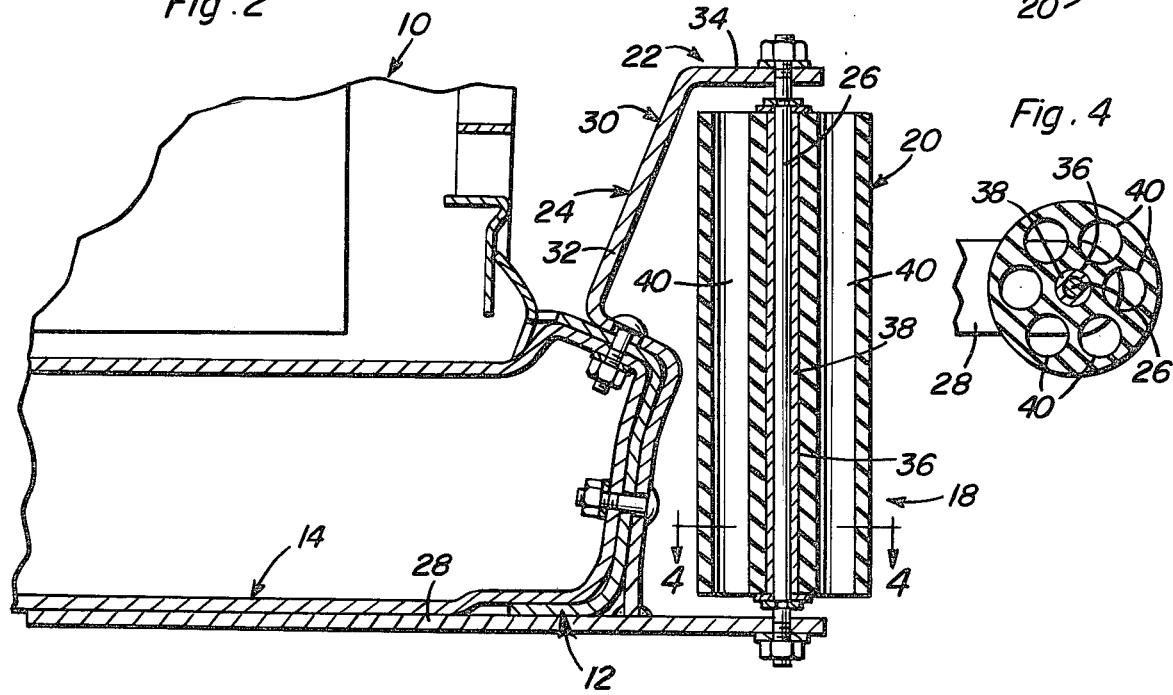
Fig. 2
Fig. 4

ROLLER VEHICLE PUSHING BUMPER

BACKGROUND OF THE INVENTION

1. Field of the Invention

This invention relates generally to bumpers for motor vehicles, and the like, and more particularly to bumpers which facilitate pushing of another vehicle by a vehicle provided with such bumpers.

2. Description of the Prior Art

It is frequently necessary for one motor vehicle to push another vehicle. Unfortunately, however, the front bumper of virtually all standard production motor vehicles is not suited to perform such pushing operations. While vehicles, such as those belonging to service stations, garages, and the like, can be specially equipped with a, for example, generally planar impact member across the front of the vheicle for engagement with a vehicle being pushed, such impact members are simply not suited to use on conventional pleasure and business vehicles due to their weight, bulkiness, and unsightly appearance. Further, such impact members are liable to cause damage to a vehicle being pushed.

While it is well known to provide motor vehicles, and the like, with resilient bumpers, such bumpers are usually of stationary construction ill suited for pushing operations. That is, these known resilient bumper elements, are mounted for absorbing impact shock only, and are not intended or generally capable of permitting one vehicle to push another vehicle in a safe manner.

Examples of resilient bumpers for motor vehicles can be found in U.S. Pat. Nos. 3,130,998, issued Apr. 28, 1964 to J. H. Andersen; 2,681,246, issued June 15, 1954 to J. Corydon II; 2,182,085, issued Dec. 5, 1939 to J. E. Kellner et al.; 3,792,890, issued Feb. 19, 1974 to L. A. R. Corretti.

SUMMARY OF THE INVENTION

It is an object of the present invention to provide motor vehicle bumpers particularly suited for permitting a vehicle so provided to push another vehicle.

It is another object of the present invention to provide an attachment for the front bumper of a motor vehicle which will protect the vehicle and another vehicle being pushed from damage during the pushing operation.

It is yet another object of the present invention to provide a bumper attachment which is compact, flexible, adaptabe to most conventional vehicles, and which can be quickly and easily installed on passenger cars and general purpose vehicles without distracting unduly from the appearance of the vehicle.

These and other objects are achieved according to the present invention by providing a vehicle pushing bumper having: a roller; and a bracket connected to the roller for rotatably mounting the roller in substantially vertical disposition on the bumper of a vehicle.

According to a preferred embodiment of the invention, the bracket includes a framework attachable to a front bumper of a motor vehicle, and an axle rotatably journaled on the framework, with the roller being rotatably journaled on the axle. Further, the framework includes a substantially planar first part journaling the axle and extending from the axle and beneath a bumper on which the framework is to be mounted. A second part of the framework has a portion shaped to conform to a bumper on which the framework is to be mounted and a portion arranged substantially parallel to the first part and journaling the axle in cooperation with the second part of the framework.

The roller is advantageously constructed from a resilient material in a cylindrical configuration, and is provided with an axial through hole arranged for receiving the axle of the bracket.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic, perspective view showing a pick-up truck provided with a pair of pushing bumpers according to the present invention.

FIG. 2 is an enlarged, fragementary, sectional view taken generally along the line 2—2 of FIG. 1.

FIG. 3 is a top plan view showing a pushing bumper according to the present invention.

FIG. 4 is a fragmentary, sectional veiw taken generally along the line 4—4 of FIG. 2.

DESCRIPTION OF THE PREFERRED EMBODIMENT

Referring now more particularly to FIG. 1 of the drawing, a vehicle 10, which is illustrated as a conventionaly pick-up truck, and the like, is provided transversely thereof with a longitudinally extending front bumper 12 substantially disposed in a vertical plane and mounted on projecting portions of frame 14 (FIG. 2) of vehicle 10 in the manner conventional with some makes of pick-up trucks, and the like. Mounted in spaced relation on bumper 12 symmetrically with respect to a midpoint of the longitudinal extent of the bumper 12 are a pair of vehicle pushing bumpers 16 and 18 according to the present invention.

Referring now more particularly to FIGS. 2 through 4 of the drawing, each of the bumpers 16, 18 includes a roller 20 rotatably mounted on a bracket 22 so as to be in a substantially vertical disposition on bumper 12 of vehicle 10 when vehicle 10 is in its usual operating orientation.

Bracket 22 includes a framework 24 attachable to a front bumper 12 of vehicle 10. A vertically disposed spindle or axle 26 is rotatably journaled on framework 24, with roller 20 being rotatably journaled on the axle 26.

Framework 24 includes a substantially planar first part 28 journaling axle 26 and extending from axle 26 and beneath bumper 12. A second part 30, which can be connected to part 28 as by welding, has a portion 32 shaped to conform to a bumper 12, and a poriton 34 arranged substantially parallel to first part 28 and disposed journaling axle 26 in cooperation with first part 28. Axle 26 may be retained extending between the opposed leg portions of framework 24 as defined by the right hand end of part 28 in FIG. 2 and by portion 34 of part 30 in a conventional manner, such as by the provision of apertures through which threaded end portions of axle 26 extend for retention by the illustrated nuts and washers.

Roller 20 is preferably constructed from a resilient material, such as a natural or synthetic rubber, and is retained on axle 26 for rotation with respect thereto such as by the illustrated locking collars. Further, roller 20 has the illustrated generally cylindrical configuration including a cylindrical surface revolving about an axial extent of the roller 20, and an axial through hole 36 arranged for receiving the axle 26 with the cylindrical surface of roller 20 being entirely spaced horizontally from the vertical plane of the bumper 12. A bushing 38 acts as a bearing sleeve between axle 26 and hole 36 in order to further reduce friction drag on the assembly.

In order to both enhance the resilient characteristics and decrease the weight of roller 20, bores 40 are advantageously provided in radial distribution about roller 20 so as to extend substantially parallel to hole 36.

As can be appreciated from the above description and from the drawing, the present invention provides an attachment for the front bumper of a vehicle for the purpose of permitting the vehicle to push another vehicle in such a manner as to protect both vehicles from damage. More specifically, the pushing bumpers include rubber rollers mounted on a, for example, metal framework which attaches to the front bumper of an automobile or other motor vehicle when the vehicle is to be used for pushing from either the front or rear another vehicle, and the like. The resilient rollers 20 are constructed in such a manner as to roll or spin on a circular or round spindle coming up through the center of the roller, thereby preventing a drag and damage to the vehicle being pushed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a motor vehicle including, arranged transversely of a longitudinal extent of the vehicle, a longitudinally extending front bumper substantially disposed in a vertical plane, a pair of vehicle pushing bumpers spaced along the bumper symmetrically with respect to a midpoint of the longitudinal extent of the bumper, each of the pushing bumpers comprising, in combination:

a. a roller; and
   b. bracket means connected to the roller for rotatably mounting the roller in substantially vertical disposition on the bumper of the vehicle, the bracket means including a framework attachable to the front bumper of the vehicle, a vertically disposed axle rotatably journaled on the freamwork, with the roller being rotatably journaled on the axle, the roller having a substantially cylindrical configuration including a cylindrical surface revolving about an axial extent of the roller, and the roller being provided with an axial through hole arranged for receiving the axle, with the cylindrical surface of the roller being entirely spaced horizontally from the vertical plane of the bumper, the framework including a substantially planar first part journaling the axle and extending from the axle and beneath the front bumper, and a second part having a portion shaped to conform to the front bumper and a portion arranged substantially parallel to the first part and disposed journaling the axle in cooperation with the first part, the roller being constructed from a resilient material, with the roller being provided with a plurality of bores in radial distribution about the roller and extending substantially parallel to the axial through hole provided in the roller.

* * * * *